United States Patent
Bretschneider et al.

(10) Patent No.: US 11,215,968 B2
(45) Date of Patent: Jan. 4, 2022

(54) NUMERICAL CONTROL SYSTEM WITH BUFFERING OF POSITION SETPOINT VALUES

(71) Applicant: Siemens Aktiengesellschaft, Munich (DE)

(72) Inventors: Jochen Bretschneider, Owingen (DE); Stephen Graham, Sachsenheim (DE); Steffen Mihatsch, Renningen (DE); Peter Schiffer, Schönaich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/018,829

(22) Filed: Sep. 11, 2020

(65) Prior Publication Data

US 2021/0080927 A1 Mar. 18, 2021

(30) Foreign Application Priority Data

Sep. 13, 2019 (EP) .................................... 19197282

(51) Int. Cl.
*G05B 19/4061* (2006.01)
*G05B 19/4155* (2006.01)

(52) U.S. Cl.
CPC ..... *G05B 19/4061* (2013.01); *G05B 19/4155* (2013.01)

(58) Field of Classification Search
None
See application file for complete search history.

(56) References Cited

U.S. PATENT DOCUMENTS

| | | |
|---|---|---|
| 2015/0261201 A1 | 9/2015 | Bretschneider |
| 2015/0273685 A1* | 10/2015 | Linnell ................. B25J 9/1664 700/184 |
| 2018/0281191 A1* | 10/2018 | Sinyavskiy ......... A47L 11/4066 |
| 2019/0196480 A1* | 6/2019 | Taylor ................. G05D 1/0214 |

FOREIGN PATENT DOCUMENTS

| | | |
|---|---|---|
| EP | 1 901 150 A1 | 3/2008 |
| EP | 2 919 081 A1 | 9/2015 |

* cited by examiner

*Primary Examiner* — Ryan A Jarrett
(74) *Attorney, Agent, or Firm* — Henry M. Feiereisen LLC

(57) ABSTRACT

A numerical control system determines iteratively a group of position setpoint values for axes of a production machine based on presets. When no risk of a collision of one moved element with another element exists, the group of position setpoint values is stored in a buffer store. Another already stored group of position setpoint values is read from the buffer store which then controls the axes and moves the element along a path defined by the sequence of the groups of position setpoint values. This process continues for as long as no risk of a collision exists. If a risk of a collision exists, the numerical control system brings the axes to a standstill. Previously unknown real time events are considered only in the determination of the groups of position setpoint values not yet stored in the buffer store. The groups of already stored position setpoint values are not altered.

7 Claims, 3 Drawing Sheets

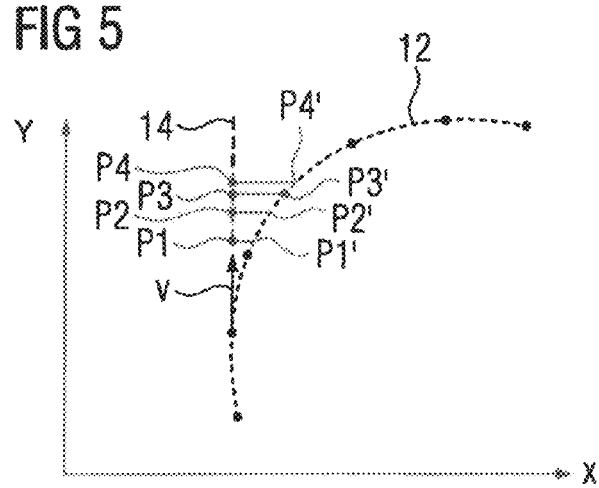
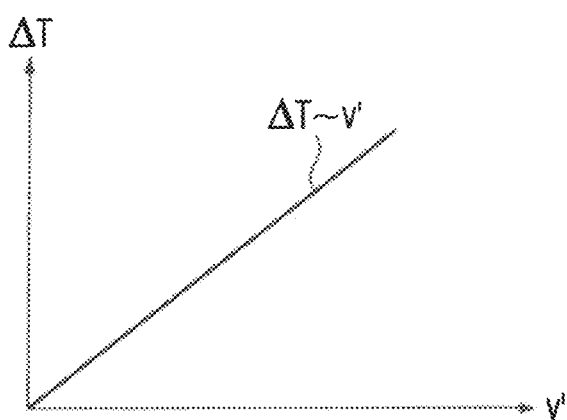

NUMERICAL CONTROL SYSTEM WITH BUFFERING OF POSITION SETPOINT VALUES

CROSS-REFERENCES TO RELATED APPLICATIONS

This application claims the priority of European Patent Application, Serial No. EP 19197282, filed Sep. 13, 2019, pursuant to 35 U.S.C. 119(a)-(d), the content of which is incorporated herein by reference in its entirety as if fully set forth herein.

BACKGROUND OF THE INVENTION

The present invention relates to a method for operating a numerical control system. The present invention further relates to a system program for a numerical control system and to a numerical control system, which is programmed with such system program. The present invention also relates to a production machine with such numerical control system.

The following discussion of related art is provided to assist the reader in understanding the advantages of the invention, and is not to be construed as an admission that this related art is prior art to this invention.

Numerical control systems, the associated production machines and the operating modes for numerical control systems and production machines are generally known.

When production machines are operated—for example, machine tools, robots or other processing machines—the risk exists that moving elements of the machines collide with other moving elements or with static elements of the production machine. In the event that the production machine is designed as a machine tool, a contact of a tool of a machine tool with the workpiece to be machined can, under some circumstances, represent a collision. Unwanted collisions can lead, inter alia, to damage to the elements colliding with one another, for example, the breaking off of a tool, the bending of a holding arm, the scratching of a workpiece. Often, such collisions are also associated with down times of the production machine.

The collision can have a variety of causes. For example, the production machine may have been wrongly programmed. It is also possible that elements have been incorrectly mounted manually, in the case of a machine tool, for example, a workpiece in a clamp. A further possible cause is a faulty presetting of the travel movement by an operating person.

Many software-supported systems are known for the prevention of collisions. These are based upon different approaches. The known systems are capable of preventing collisions in a plurality of situations. However, the prior art systems have faults, in particular, in the processing of real time events that can lead, during the execution of a part program or the like, to a control of the position-controlled axes, effectively at the last moment, and thereby to a movement of the elements of the production machine that is not expected as such. The cause of such movements can be, for example, so-called asynchronous movements, synchronous actions, coupled movements and user inputs (particularly in the so-called JOG mode). Other causes are also possible.

It is known in the prior art not to take account of such real time events at all. In this case, the risk that a real time event leads to a collision is simply accepted.

It is further known in the prior art to take account of such real time events in that the elements of the production machine must maintain a minimum spacing from one another. If movements are pre-set during which the minimum spacing is undershot, either the relevant movement is not permitted or at least the travel velocity is reduced. With this procedure, collisions can also be prevented on occurrence of real time events. However, this solution has the disadvantage that movements which, as such, do not cause a collision but during which the minimum spacing is undershot, are not possible, or at least only at a reduced velocity and therefore with reduced productivity. The possibilities of the production machine can thus, where the approach of elements of the production machine to one another or to other elements is concerned cannot be used, or only with a reduced productivity.

It would therefore be desirable and advantageous to obviate prior art shortcomings and to provide an improved approach for optimizing the productivity of a production machine, wherein despite taking account of real time events in the determination of the position setpoint values, a collision of elements of the production machine during operation can be prevented with a probability bordering on certainty.

SUMMARY OF THE INVENTION

According to one aspect of the present invention, a method for operating a numerical control system is provided, wherein the numerical control system executes a system program, wherein the numerical control system, while executing the system program,
a) determines, using presets, a group of position setpoint values for position-controlled axes of a production machine controlled by the numerical control system,
b) checks whether, during control of the position-controlled axes with the determined group of position setpoint values, a risk of a collision of an element moved by the control of the position-controlled axes with another element exists,
c) when no risk of a collision exists, stores the group of position setpoint values in a buffer store and reads out from the buffer store at least one other group of position setpoint values already stored in the buffer store, and controls the position-controlled axes according to the at least one other group of position setpoint values read out from the buffer store, and returns to step a), thus moving the element moved by the position-controlled axes along a path defined by a sequence of the groups of position setpoint values, and
d) when a risk of a collision exists, brings the position-controlled axes to a standstill,
e) wherein the numerical control system considers previously unknown real time events only when determining groups of position setpoint values to be stored in the buffer store, while not altering the groups of position setpoint values already stored in the buffer store.

Between a respective writing time point at which a respective group of position setpoint values is stored in the buffer store and a respective readout time point at which the same group of position setpoint values is read out of the buffer store, there is therefore a dwell time during which the respective group of position setpoint values is stored in the buffer store. During the dwell time in the buffer store, the respective group of position setpoint values is no longer changed. Expressed differently, a real time event that is not already known to the numerical control system at the time point of the determination of the respective group of position setpoint values and the thereby effected control of the position-controlled axes is no longer taken into account. The real time event acts firstly on the next determined group of position setpoint values. By this means, the actual control of the position-controlled axes with position setpoint values only takes place with groups of position setpoint values for which it has been tested whether the risk of a collision exists. Taking account only in the case of position setpoint values not yet stored in the buffer store thus leads to a slight delay in taking account of real time events. However, this slight delay can be tolerated without difficulty.

The real time events, that is, the circumstances not known to the numerical control system in advance, can be, for example, travel movements required by an operating person, so-called asynchronous movements, synchronous actions and travel movements initiated thereby and the like.

It is possible that the dwell time is a static quantity. In this event, the dwell time can be determined, in particular, taking account of the dynamics of the position-controlled axes, that is, the maximum possible movement travel velocities and the maximum possible accelerations. Alternatively, it is possible that the numerical control system dynamically sets the dwell time dependent upon a travel velocity of at least one of the position-controlled axes. In this event, the setting of the dwell time thus takes place taking account of the actual travel velocities and of the maximum possible accelerations of the position-controlled axes.

Preferably, the dwell time is dimensioned such that the numerical control system is able to bring the position-controlled axes to a standstill within the dwell time. In some cases, however, it can also be acceptable to dimension the dwell time somewhat smaller. In this case, however, a collision is still possible, but the collision takes place at an already reduced velocity. Under certain circumstances, this can be tolerated.

In many cases, it is sufficient that the numerical control system undertakes an uncoordinated control of the position-controlled axes to bring the position-controlled axes to a standstill if the risk of a collision exists, and thus brakes the position-controlled axes individually with their respective maximum possible acceleration. It is preferable, however, that if the risk of a collision exists, the numerical control system coordinates the control of the position-controlled axes such that the element moved by the position-controlled axes is brought to a standstill along the path defined by the sequence of groups of position setpoint values already stored in the buffer store. Thereby, the path already checked in advance for collision-freedom is also halted if the risk of a collision is recognized for the newly checked group of position setpoint values and thereby a stopping of the movement is triggered. A collision can thus be more reliably prevented.

According to another aspect of the invention, a system program for a numerical control system includes machine code stored on a computer-readable non-transitory storage medium, wherein the machine code when loaded into a memory of the numerical control system and executed by the numerical control system, causes the numerical control system to execute the aforedescribed method.

According to another aspect of the invention, a numerical control system program is programmed with the aforementioned system program and carries out the operating method according to the invention.

According to yet another aspect of the invention, a production machine having the features includes the aforementioned numerical control system and is configured carries out the operating method according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 shows the time-dependent position of an element in the x-y-plane;
and
FIG. 6 shows schematically the dwell time as a function of the travel velocity of an element.

DETAILED DESCRIPTION OF PREFERRED EMBODIMENTS

Figure 1:
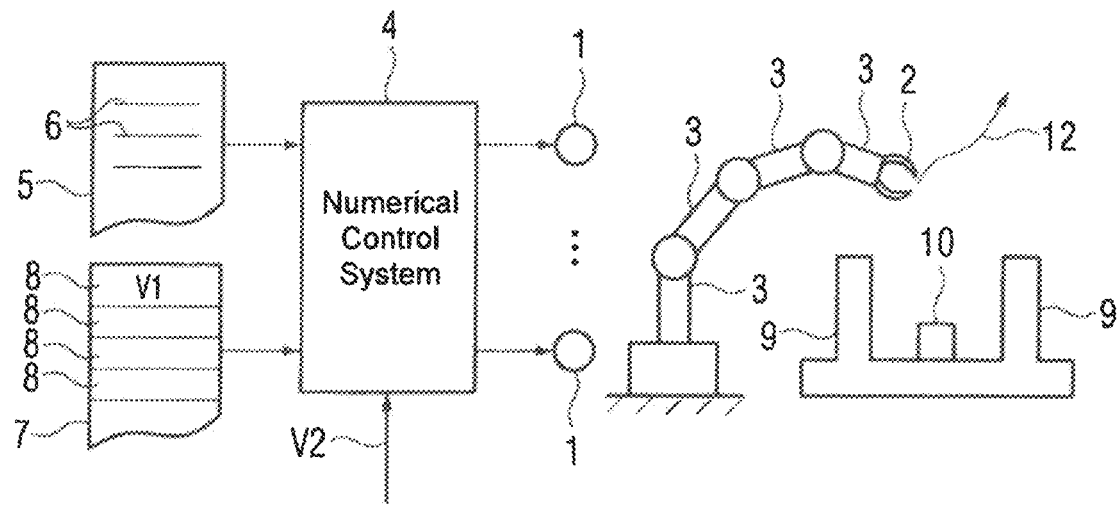
FIG. 1 shows a machine tool.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a production machine having a plurality of position-controlled axes 1. Purely by way of example, a robot is shown in FIG. 1. The production machine can, however, be configured differently, for example, as a machine tool or as a handling machine.

An element 2 of the production machine is moved by the position-controlled axes 1. The number of position-controlled axes 1 can be as needed. Often, three to eight position-controlled axes 1 are present. With regard to the travel movement, typically only the "actually desired" element 2 is considered, for example, in the case of a robot, a gripper. Stated precisely, all the intermediate members 3 which are required for the movement of the actually desired element 2, in this case, therefore, the grippers, must also be considered.

Figure 2:
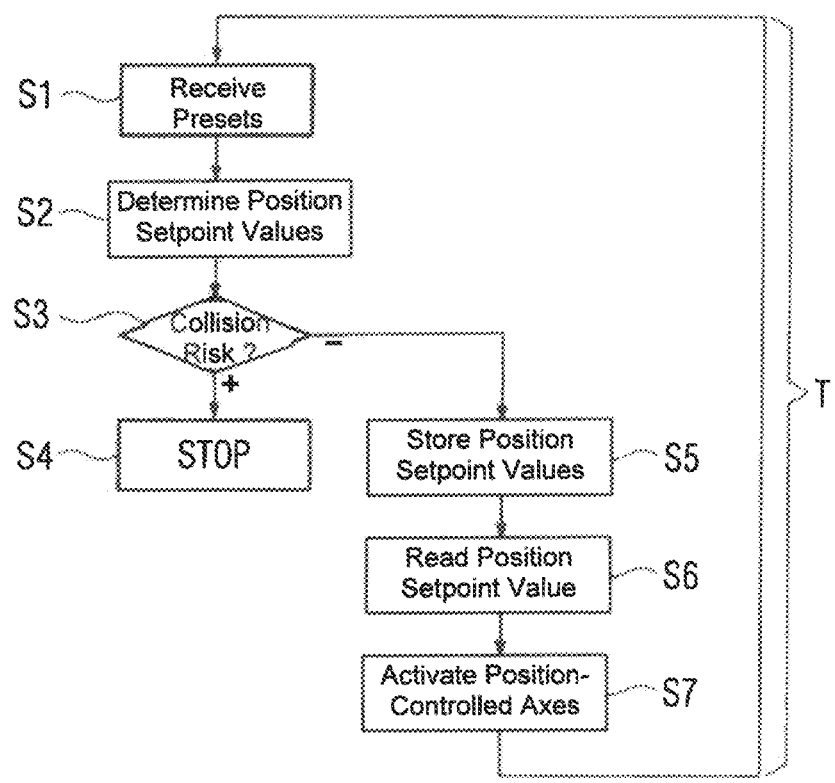
FIG. 2 is a process flow diagram according to the present invention.

The production machine further has a numerical control system 4. The position-controlled axes 1 are controlled by means of the numerical control system 4 and the element 2 is moved thereby. The numerical control system 4 is programmed with a system program 5. The system program 5 comprises machine code 6. On the basis of the programming of the numerical control system 4 with the system program 5, the numerical control system 4 executes the machine code 6. The execution of the machine code 6 by the numerical control system 4 causes the numerical control system 4 to carry out an operating method which is described in greater detail below making reference to FIG. 2. The numerical control system 4 thus carries out the operating method described below while executing the system program 5.

Firstly, in a step S1, the numerical control system 4 receives the presets V1, V2. In a step S2, the numerical control system 4 determines at least one group of position setpoint values xi* (where i=1, 2, . . . , n, and n is the number of position-controlled axes 1). When determining the position setpoint values xi*, the numerical control system evaluates the presets V1, V2.

A part of the presets V1, V2, specifically the presets V1, can be known in advance to the numerical control system 4, i.e. in principle, a long time before the control of the position-controlled axes 1 according to the presets V1, V2. For example, the numerical control system 4 can be preset with a parts program 7 (see FIG. 1) and the presets V1 can be defined by command sets 8 of the parts program 7. The presets V2, however, are not known in advance. They can take place at any time and are therefore only fixed when the position setpoint values xi* are determined by the numerical control system 4. The presets V2 are thus real time events, which are not known in advance to the numerical control system 4, in particular, external real time events, which are triggered, for example, by operating actions of a user and are not initiated internally in the control system.

The position setpoint values xi* determined can relate to a common coordinate system. In this event, the corresponding control values for the position-controlled axes 1 must possibly be determined by means of a kinematic transformation. Alternatively, the position setpoint values xi* can be directly and immediately the control values for the individual position-controlled axes 1.

It is possible that the numerical control system 4 determines in step S1—in particular, in the context of the so-called interpolation—a plurality of groups of position setpoint values xi*, that is, a temporal sequence of groups of position setpoint values xi*. Typically, however, the numerical control system 4 determines only a single group of position setpoint values xi*.

In a step S3, the numerical control system 4 checks whether, during control of the position-controlled axes 1 with the position setpoint values xi* determined in step S2, the risk of a collision exists. It is checked herein whether the risk of a collision of at least one element 2, 3 moved by the control of the position-controlled axes 1 with at least one other element 2, 3, 9, 10 exists. A comprehensive checking of all the moved elements 2, 3 with all the other elements 2, 3, 9, 10 coming into question therefore takes place.

For example, it is checked whether the element 2 collides with one of the intermediate members 3, a stationary element 9 or, for example, also (where undesirable) with a workpiece 10. It is also checked, in relation to the intermediate members 3, whether they collide with one of the other intermediate members 3, a stationary element 9 or, for example, with the workpiece 10. If the workpiece 10 is also moved, it is also checked with regard to the workpiece 10 whether it collides with a stationary element 9. The relevant checks as such are generally known to persons skilled in the art and therefore need not be described in detail. For example, the different elements 2, 3, 9, 10 can be modeled by means of elementary geometrical bodies, the movement of which is modeled taking account of the kinematic functional chain corresponding to the control of the individual position-controlled axes 1.

If the numerical control system 4 recognizes in step S3 that the risk of a collision exists, the numerical control system 4 transfers to a step S4. In step S4, the numerical control system 4 brings the position-controlled axes 1 to a standstill. It thus stops the movement in order to prevent a collision.

If, however, the numerical control system 4 recognizes in step S3 that no risk of a collision exists, the numerical control system 4 transfers to a step S5. In step S5, the numerical control system 4 stores the groups of position setpoint values xi* determined in step S2 in a buffer store 11 according to the representation of FIG. 3. Furthermore, in a step S6, the numerical control system 4 reads out from the buffer store 11 at least one other—typically exactly one other—group of position setpoint values xi*. The position setpoint values xi* read-out are thus position setpoint values xi* which are already stored in the buffer store 11 at the time point at which in step S5 the position setpoint values xi* determined in step S2 are already stored in the buffer store 11. In a step S7, the numerical control system 4 then controls the position-controlled axes 1 according to the groups of position setpoint values xi* read out from the buffer store 11 in step S6. Thereby, the element 2 is moved to the position determined by the respective group of position setpoint values xi*. Then the numerical control system 4 returns to step S1. On the next execution of the steps S6 and S7, the element 2 is now moved to the position determined by the newly read-out group of position setpoint values xi*. By means of the sequence of the read-out groups of position setpoint values xi*, the element 2 is thus moved along a path 12 (see FIG. 1). The path 12 is defined by the sequence of the groups of position setpoint values xi*.

Figure 3:
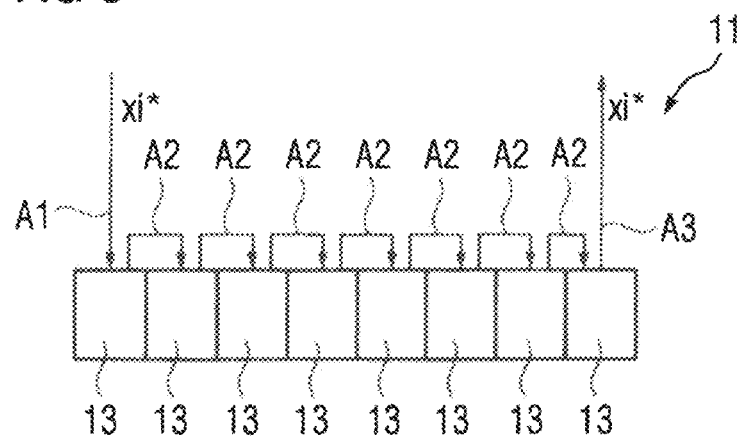
FIG. 3 illustrates a buffer store.

The buffer store 11 can be configured, for example, according to the representation in FIG. 3 in the manner of a shift register. In this case, in the first position of the shift register 11, a new group of position setpoint values xi* is stored respectively (step S5). At the same time, the groups of position setpoint values xi* already stored in the buffer store 11 are shifted by one position further. The group of position setpoint values xi* which is situated at the last position of the shift register 11 is read out (step S7) from the buffer store 11. This situation is indicated in FIG. 3 by the arrows A1 to A3. Alternatively, the buffer store 11 can be configured, for example, in the manner of a circular buffer. Similar statements apply in this case. Other embodiments are also readily known to a person skilled in the art. In each case, the group of position setpoint values xi* read out is used for control of the position-controlled axes 1.

By means of the buffer store 11, it is achieved that the numerical control system 4 takes account of previously unknown real time events (this corresponds to the presets V2) exclusively in the context of the determination of the groups of position setpoint values xi* that are stored in the buffer store 11, that is, those groups of position setpoint values xi* which are not yet stored in the buffer store 11 at this time point. The groups of position setpoint values xi* already stored in the buffer store 11, however, are no longer altered. They will only be read out and used for control of the position-controlled axes 1.

Typically, the numerical control system 4 executes its entire operating method clocked. With each time interval T, therefore (at least) one new group of position setpoint values xi* is stored in the buffer store 11 and (at least) one group of position setpoint values xi* already in the buffer store 11 is read out from the buffer store 11. The time interval T can be as required. For example, it can be 4 ms or 2 ms or even 250 μs or 125 μs. In addition, the buffer store 11 has a particular number k of storage spaces 13, for example, as per the representation in FIG. 3, eight storage spaces 13. Between the storage of a particular group of position setpoint values xi* into the buffer store 11 and the reading out of the same group of position setpoint values xi* out from the buffer store 11, therefore, a timespan ΔT elapses during which the respective group of position setpoint values xi* is stored in the buffer store 11. This timespan ΔT is hereinafter referred to as the dwell time. The dwell time ΔT is the product of the time interval T and the number k of storage spaces 13 in the buffer store 11:

$$\Delta T = kT.$$

Figure 4:
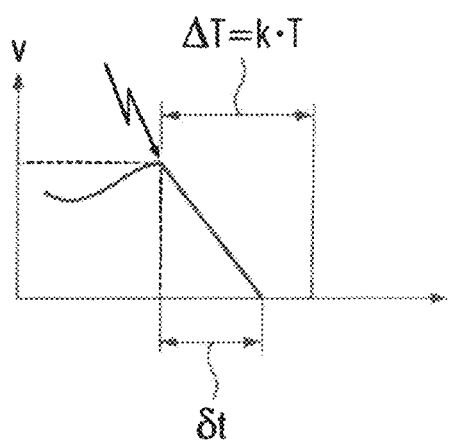
FIG. 4 is a time diagram illustrating stopping of the machine.

If the numerical control system 4 detects the risk of a collision in step S3 (indicated in FIG. 4 by a lightning bolt sign) and therefore transfers from step S3 to step S4 and brings the position-controlled axes 1 to a standstill, the execution of step S4 according to the representation in FIG. 4 requires a certain timespan δt. This timespan δt is designated the stopping time below. Preferably, the stopping time δt is less than the dwell time ΔT. By this means, it is achieved that the numerical control system 4 can bring the position-controlled axes 1 to a standstill within the dwell time ΔT.

A design of the buffer store 11 of this type is also possible without difficulty. If, for example, the maximum possible or permissible velocity is 60 m/min (or 1 m/s) and in step S4 a braking at 20 m/s$^2$ can be carried out, then for braking to a standstill, a maximum of 50 ms is required. The maximum possible or permissible velocity and the delay cited are typical values even if they can be exceeded or undershot in individual cases. At a time interval T of 4 ms—also a typical value—a bringing to a standstill takes place, purely by calculation, during 50 ms/4 ms=12.5 time intervals T. Since the buffer store 11 can only have whole storage spaces 13, in this case, the buffer store 11 must therefore have at least thirteen storage spaces 13. At a lower velocity of, for example, 20 m/min (or 33 cm/s), in this case only 16.7 ms is needed, which, purely by calculation, corresponds to 16.7 ms/4 ms=4.133 time intervals T. In this case, the buffer store 11 must only have at least five storage spaces 13.

The corresponding design of the buffer store 11 is advantageous, in particular, if the numerical control system 4 coordinates the control of the position-controlled axes 1, even in the case of the risk of a collision, such that the element 2 is moved by the position-controlled axes 1 along the path 12 as defined by the groups of position setpoint values xi* which are already stored in the buffer store 11. This will now be described in greater detail on the basis of a simple example, making reference to FIG. 5. The situation described below in relation to FIG. 5 is, however, also valid for other embodiments in an entirely similar manner.

In the representation according to FIG. 5—purely by way of example—it is assumed that the moving element 2 should be moved in a plane along a circular path. It is further assumed that by means of one of the position-controlled axes 1, a displacement of the moved element 2 in each of the directions of the two coordinate axes x, y shown in FIG. 5 takes place. The coordinate axes x, y are designated, for short, as the x-axis and the y-axis. Embodiments of production machines in which by means of a position-controlled axis 1, in each case, such travel movements orthogonal to one another are brought about, are generally known in machine tools. It is further assumed that the numerical control system 4 recognizes the risk of a collision at a time point at which the instantaneous velocity v of the moving element 2 extends parallel to the y-axis according to the representation in FIG. 5. At this time point, therefore, a movement of the moved element 2 takes place exclusively in the direction of the y-axis.

If, given this situation, a collision is detected, typically, all the position-controlled axes 1 are braked independently of one another as rapidly as possible. Since, in the example given, at the given time point, exclusively the position-controlled axis 1 has a velocity value different from 0 for the movement in the direction of the y-axis, only this one position-controlled axis 1 is braked. In all the other position-controlled axes 1, this is not necessary, since they are already static.

If four time intervals T are required to transfer the position-controlled axis 1 for the movement in the direction of the y-axis, the element 2 is moved in step S4 along a path 14. The path 14 with its associated path points P1 to P4 extends, according to the above specific example, parallel to the y-axis. However, this is the case only purely by chance. It is decisive that the path 14 deviates from the path 12, as defined by the position setpoint values xi which are already stored in the buffer store 11, thus in this case, from the circular path.

According to the advantageous embodiment, the position-controlled axis 1 for the movement in the direction of the y-axis brakes as described above. The procedure for the position-controlled axis 1 for the movement in the direction of the y-axis is therefore the same as during braking on the path 14. As distinct from the usual procedure, however, in the context of the advantageous embodiment, the numerical control system 4 determines associated control values also for the position-controlled axis 1 for the movement in the direction of the x-axis, so that the element 2 is moved on the circular path or, generally, the path 12. In place of the path points P1 to P4, the element 2 is therefore moved, during the time intervals T required for stopping, to modified path points P1' to P4'. In the selected example, the element 2 comes to a halt at the modified path point P4'. The advantage is that also during stopping of the movement of the element 2, the halting takes place on the path 12, for which the risk of a collision does not exist.

The preferred procedure according to the invention has been described with a simple example above. It is, however, also realizable in a similar manner with other configurations of the path 12.

It is possible that the dwell time ΔT is a constant. Alternatively, it is possible according to the representation of FIG. 6, that the numerical control system 4 dynamically sets the dwell time ΔT dependent upon the travel velocity v' of at least one of the position-controlled axes 1. In particular, a corresponding adaptation of the number k of storage spaces 13 of the buffer store 11 can take place. The travel velocity v' can be, for example, the travel velocity of the position-controlled axis 1 which needs the most time for stopping. Alternatively, it can be a travel velocity derived from the totality of the travel velocities of the position-controlled axes 1, in particular, the travel velocity v at which the moved element 2 is moved.

In summary, the present invention relates to the following subject matter:

A numerical control system 4 executes a system program 5. Herein, while evaluating presets V1, V2, it determines iteratively respectively at least one group of position setpoint values xi* for position-controlled axes 1 of a production machine controlled by the numerical control system 4. In each case, it checks whether, during control of the position-controlled axes 1 with the determined groups of position setpoint values xi*, the risk of a collision of at least one element 2, 3 moved by the control of the position-controlled axes 1 with at least one other element 2, 3, 9, 10 exists. If no such risk exists, the numerical control system 4 stores the at least one group of position setpoint values xi* in a buffer store 11, reads out from the buffer store 11 at least one other group of position setpoint values xi* already stored in the buffer store 11 and controls the position-controlled axes 1 according to the at least one group of position setpoint values xi* read out from the buffer store 11. It continues this procedure for as long as no risk of a collision exists. The element 2 moved by the position-controlled axes 1 is thereby moved along a path 12 defined by the sequence of the groups of position setpoint values xi*. If the risk of a collision exists, the numerical control system 4 brings the position-controlled axes 1 to a standstill. The numerical control system 4 takes account of previously unknown real time events V2 exclusively in the context of the determination of the groups of position setpoint values xi* which are to be stored in the buffer store 11. However, it no longer alters the groups of position setpoint values xi* already stored in the buffer store 11.

The present invention has many advantages. For instance, the collision check can be reduced to a check in the so-called main run of the numerical control system 4. An additional check also in the so-called pre-run can be dispensed with. However, in almost all cases, a reliable stopping of the production machine without the risk of a collision can be achieved. This applies, in particular, if also during stopping of the production machine (step S4), the path 12 as defined by the groups of position setpoint values xi* stored in the buffer store 11 is maintained.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method, comprising:
   executing a system program with a numerical control system;
   while executing the system program, with the numerical control system
   a) determining, using presets, a group of position setpoint values for position-controlled axes of a production machine controlled by the numerical control system,
   b) checking whether, during control of the position-controlled axes with the determined group of position setpoint values, a risk of a collision of an element moved by the control of the position-controlled axes with another element exists,
   c) when no risk of a collision exists, storing the group of position setpoint values in a buffer store and reading out from the buffer store at least one other group of position setpoint values already stored in the buffer store, and controlling the position-controlled axes according to the at least one other group of position setpoint values read out from the buffer store, and returning to step a), thus moving the element moved by the position-controlled axes along a path defined by a sequence of the groups of position setpoint values, and
   d) when a risk of a collision exists, bringing the position-controlled axes to a standstill,
   wherein the numerical control system considers previously unknown real time events only when determining groups of position setpoint values to be stored in the buffer store, while not altering the groups of position setpoint values already stored in the buffer store.

2. The method of claim 1, further comprising dynamically setting with the numerical control system a dwell time during which a group of position setpoint values is stored in the buffer store, dependent upon a travel velocity of at least one of the positon-controlled axes.

3. The method of claim 1, further comprising setting a dwell time during which a group of position setpoint values is stored in the buffer store such that the position-controlled axes are brought to a standstill within the dwell time.

4. The method of claim 1, further comprising, when a risk of a collision exists, coordinating control of the position-controlled axes such that the element moved by the position-controlled axes is brought to a standstill along the path defined by the sequence of the groups of position setpoint values already stored in the buffer store.

5. A system program for a numerical control system, the system program comprising machine code stored on a computer-readable non-transitory storage medium, wherein the machine code when loaded into a memory of the numerical control system and executed by the numerical control system, causes the numerical control system to
   a) determine, using presets, a group of position setpoint values for position-controlled axes of a production machine controlled by the numerical control system,
   b) check whether, during control of the position-controlled axes with the determined group of position setpoint values, a risk of a collision of an element moved by the control of the position-controlled axes with another element exists,
   c) when no risk of a collision exists, store the group of position setpoint values in a buffer store and read out from the buffer store at least one other group of position setpoint values already stored in the buffer store, and control the position-controlled axes according to the at least one other group of position setpoint values read out from the buffer store, and return to step a) so that the element moved by the position-controlled axes is moved along a path defined by a sequence of the groups of position setpoint values, and
   d) when a risk of a collision exists, bring the position-controlled axes to a standstill,
   wherein the numerical control system considers previously unknown real time events only when determining groups of position setpoint values to be stored in the buffer store, while not altering the groups of position setpoint values already stored in the buffer store.

6. A numerical control system programmed with the system program of claim 5.

7. A production machine, comprising
   a plurality of position-controlled axes constructed to move an element of the production machine, and
   a numerical control system controlled by a system program comprising machine code stored on a computer-readable non-transitory storage medium, wherein the machine code when loaded into a memory of the numerical control system and executed by the numerical control system, causes the numerical control system to
   a) determine, using presets, a group of position setpoint values for the position-controlled axes of the production machine,
   b) check whether, during control of the position-controlled axes with the determined group of position setpoint values, a risk of a collision of an element moved by the control of the position-controlled axes with another element exists,
   c) when no risk of a collision exists, store the group of position setpoint values in a buffer store and read out from the buffer store at least one other group of position setpoint values already stored in the buffer store, and control the position-controlled axes according to the at least one other group of position setpoint values read out from the buffer store, and return to step a) so that the element moved by the position-controlled axes is moved along a path defined by a sequence of the groups of position setpoint values, and d) when a risk of a collision exists, bring the position-controlled axes to a standstill, wherein the numerical control system considers previously unknown real time events only when determining groups of position setpoint values to be stored in the buffer store, while not altering the groups of position setpoint values already stored in the buffer store.

* * * * *